A. R. LANE.
Coupling for Telegraph-Wire.

No. 202,556. Patented April 16, 1878.

WITNESSES:

INVENTOR:
A. R. Lane.
BY
ATTORNEYS.

UNITED STATES PATENT OFFICE.

AUGUSTUS R. LANE, OF NEW YORK, N. Y.

IMPROVEMENT IN COUPLINGS FOR TELEGRAPH-WIRES.

Specification forming part of Letters Patent No. 202,556, dated April 16, 1878; application filed August 24, 1877.

*To all whom it may concern:*

Figure 1:
Figure 2:
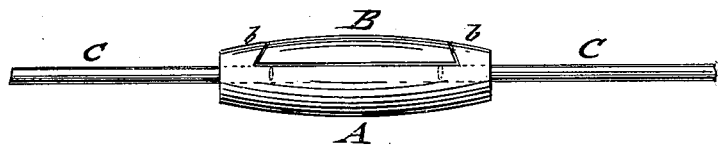

Be it known that I, AUGUSTUS R. LANE, of New York city, in the county and State of New York, have invented a new and Improved Coupling for Telegraph-Wires, of which the following is a specification:

In the accompanying drawing, Figure 1 represents a top view of my improved coupling for telegraph-wires, shown in open position with sliding cover detached. Fig. 2 is a side view of the same in closed position, and Fig. 3 a top view of the coupling as used for attaching branch wires.

Similar letters of reference indicate corresponding parts.

The object of this invention is to provide for the connection of telegraph-wires an improved coupling, that admits the quick and convenient connecting of the ends of the wires in a more economical and effective manner than by the present wire-joints. The ends of the wires are protected against moisture, and any break in the wires is quickly repaired without requiring specially skilled workmen.

Hitherto telegraph-wires were jointed by connecting the wires and bending the ends spirally around the jointed parts, by which not only a considerable loss of material was entailed, but also, by the shape of the joint, a surface obtained that catches the wind and collects moisture, so as to create a tendency to weaken the electric current.

My invention is intended to dispense with these objections to the present joints; and it consists of a coupling for the bent ends of the wires, which are inserted through the perforated ends of the main section, secured to the recessed interior part, and finally locked by a detachable slide-piece or cover.

Referring to the drawing, A represents the main portion of my improved coupling for telegraph, fence, and other wires, which is perforated at the ends, recessed at the interior part, and open at one side for the sliding cover or locking-section B.

Figure 3:
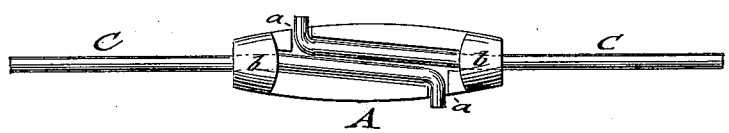

The wires C are bent at the ends, to be coupled by an instrument of suitable construction, so as to assume either a wave-like form, as in Fig. 1, or a slight inclination with angularly-bent ends, as in Fig. 3, the recess of the main portion A being made of corresponding shape, so that when the ends of the wire are inserted through the end perforations, they may be arranged sidewise of each other, and, in case of the angularly-bent end, passed out through side holes *a* of the main portion A. When the wires are thus placed in position in the main part of the coupling, the sliding cover B is inserted so as to bind on the wire ends and lock them rigidly in position.

The sliding cover is guided in dovetail recesses of the main portion, and when in position firmly locked by a nick given to one of the guides *b* of the main portions, by which the cover is firmly held in position.

The entirely-closed coupling is preferably used for connecting the wires, as no moisture can enter to the same, while the couplings with side holes and projecting ends are very useful for attaching branch wires for stations.

The coupling is made of circular cross-section, and slightly tapering toward the ends, so as to offer very little resistance to the wind, and form a neat, strong, and reliable jointing device for the wires.

Having thus described my invention, what I claim as new, and desire to secure by Letters Patent, is—

1. A coupling for telegraph-wires, consisting of a main section, A, open at one side, and having end holes and interior recess, and of a locking-section sliding in guides of the main section, substantially as and for the purpose set forth.

2. The combination of the bent wire ends C with the main portion of the coupling, having end holes and interior recess for the wire ends, and with the binding or closing section, sliding in guides of the main portion, substantially as specified.

3. The combination of the bent wire ends with the connecting-coupling, having side holes for the projecting ends of the wires, substantially as described.

AUGUSTUS R. LANE.

Witnesses:
PAUL GOEPEL,
JAMES H. HUNTER.